United States Patent [19]

Siemer

[11] Patent Number: 5,762,313
[45] Date of Patent: Jun. 9, 1998

[54] MOTOR VEHICLE UPPER MACPHERSON STRUT STEP BEARING

[75] Inventor: Hubert Siemer, Dinklage, Germany

[73] Assignee: Lemförder Metallwaren AG, Lemförde, Germany

[21] Appl. No.: 618,341

[22] Filed: Mar. 19, 1996

[30] Foreign Application Priority Data

Mar. 30, 1995 [DE] Germany .................. 195 11 641.0

[51] Int. Cl.[6] ...................................................... F16F 7/00
[52] U.S. Cl. ..................... 248/635; 267/141.1; 267/220; 248/634
[58] Field of Search .................. 248/634, 635, 248/638; 180/321.11; 280/668; 267/141.4, 141.5, 220

[56] References Cited

U.S. PATENT DOCUMENTS

| | | | |
|---|---|---|---|
| 2,869,811 | 1/1959 | Boschi | 267/141.4 |
| 3,957,127 | 5/1976 | Bouchard et al. | 248/634 X |
| 4,462,608 | 7/1984 | Lederman | 267/220 X |
| 4,477,061 | 10/1984 | Kawaura et al. | 188/321.11 X |

FOREIGN PATENT DOCUMENTS

| | | |
|---|---|---|
| 0 065 235 A1 | 11/1982 | European Pat. Off. |
| 0 381 560 B1 | 8/1990 | European Pat. Off. |
| 1 983 947 | 4/1968 | Germany. |
| 32 37 363 A1 | 8/1983 | Germany. |
| 616689 | 1/1949 | United Kingdom .................. 248/635 |

Primary Examiner—Derek J. Berger
Attorney, Agent, or Firm—McGlew and Tuttle

[57] ABSTRACT

An upper MacPherson strut step bearing for wheel suspensions in a motor vehicle, including a metallic support body which can be connected to a shock absorber, a metallic support flange which can be fastened to the vehicle body, both of which are connected to one another by a vulcanized elastomeric material. The vulcanized elastomeric material includes a rubber buffer with a lower stop face for a support disk, against the underside of which a coil spring is supported by means of a buffer ring, and an upper stop face for a flange disk which is rigidly connected to the support piece. To optimize the transmission of force through the elastomeric material, the support flange has, in the vertical section of an axial plane, an annular U-shaped section with a bottom which is parallel to the lower stop face, which U-shaped section encloses an essential amount of the material of the rubber buffer on three sides in the manner of a chamber with one side open in the direction of action of the load occurring.

12 Claims, 3 Drawing Sheets

5,762,313

MOTOR VEHICLE UPPER MACPHERSON STRUT STEP BEARING

FIELD OF THE INVENTION

The present invention pertains to an upper MacPherson strut step bearing for wheel suspensions in a motor vehicle including a metallic support body which can be connected to a shock absorber, a metallic support flange which can be fastened to the vehicle body, both of which can be connected to one another by a vulcanized elastomeric material, with a rubber buffer and with a lower stop face for a support disk, against the under side of which a coil spring is supported by a buffer ring and with an upper stop face for a flange disk rigidly connected to the support body.

BACKGROUND OF THE INVENTION

Such design features have been known from EP 0 065 235 -A1. The metallic support flange, which extends approximately horizontally in the installed position in the prior-art MacPherson strut step bearing, is provided with an inwardly arched neck, which is formed by deforming the material, is likewise directed horizontally with its lower edge, and surrounds the support body at a certain distance, so that an elastomeric material connected to both components by vulcanization is located in the vertical section between these two components.

MacPherson strut step bearings, in which rubber buffers with annular stop faces are formed from the elastomeric material on the top side of the support flange and on the underside of a horizontally formed neck edge, are installed in motor vehicles by many manufacturers. A stop face on the top side acts against a flange disk connected to the support body, while a stop face on the underside comes into contact with a supporting disk, and the coil spring of the MacPherson strut is supported with the buffer ring against the underside of the said supporting disk.

Similar arrangements have been disclosed in EP 0 381 560 -B1, DE-GM 19 83 947, and DE 32 37 363 -A1.

Both the forces originating from coil springs acting as bearing springs and the forces originating from the shock absorber are transmitted by the rubber buffers with the annular stop faces in the prior-art MacPherson strut bearings. High loads require stop faces of a correspondingly dimensioned size in order to keep the surface pressure occurring in the elastomeric material low.

SUMMARY AND OBJECTS OF THE INVENTION

Correspondingly, the object of the present invention is to provide a design for improving the transmission of force through the elastomeric material of the rubber buffers and its support element in a MacPherson strut bearing including a metallic support body which can be connected to a shock absorber, a metallic support flange which can be fastened to the vehicle body, both of which can be connected to one another by a vulcanized elastomeric material, with a rubber buffer and with a lower stop face for a support disk, against the under side of which a coil spring is supported by a buffer ring and with an upper stop face for a flange disk rigidly connected to the support body.

According to the invention, an upper MacPherson strut step bearing for wheel suspensions in a motor vehicle is provided comprising a metallic support body which can be connected to a shock absorber and a metallic support flange which can be fastened to the vehicle body, both of which are connected to one another by a vulcanized elastomeric material. The vulcanized elastomeric material includes a rubber buffer with a lower stop face. A support disk is provided which engages the lower stop face. A coil spring is supported by means of a buffer ring against the underside of the support disk. Buffer 11 includes an upper stop face for engaging a flange disk which is rigidly connected to the support body. The support flange includes an annular U-shaped section with a bottom which is parallel to the lower stop face and encloses an essential amount of the material of the rubber buffer on three sides in the manner of the chamber with one side that is open in the direction of action of the loads occurring and the vertical section of plane through which the longitudinal axis of the MacPherson strut bearing extends.

Compared with prior-art embodiments, these design features make it possible to obtain larger stop faces of the rubber buffers, so that relatively low surface pressures are generated, as desired, even under high loads. The forces occurring during the spring deflection are transmitted via the lower stop face of the rubber buffer, and the forces occurring during the rebound are transmitted via the upper stop face of the rubber buffer. The volume of the rubber buffer remains constant under load, and it cannot yield laterally by squeezing due to the material of the rubber buffer being encapsulated. The property of the material that it is not compressible in the case of all-round encapsulation is utilized here. The compliance of the upper and lower stop buffers can thus be designed to be nearly equal. The geometric design of the annular component encapsulating the elastomer represents a nearly rigid element in the principal direction of the flow of force. Furthermore, a geometric structural element, whose height and width can be varied as desired in order to make possible an adaptation to different applications, is available because of the possibility of the variable design of the overall height of the annular U-shaped section. The elastomeric material enclosed is accepted as a "dead material" in order to obtain the advantages offered by the possibility of flexible design. The incompressibility of the elastomeric material is the basis for the functionality of the design. The material connecting the support body to the support flange and the material of the rubber buffer are the same and are advantageously vulcanized in one piece.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
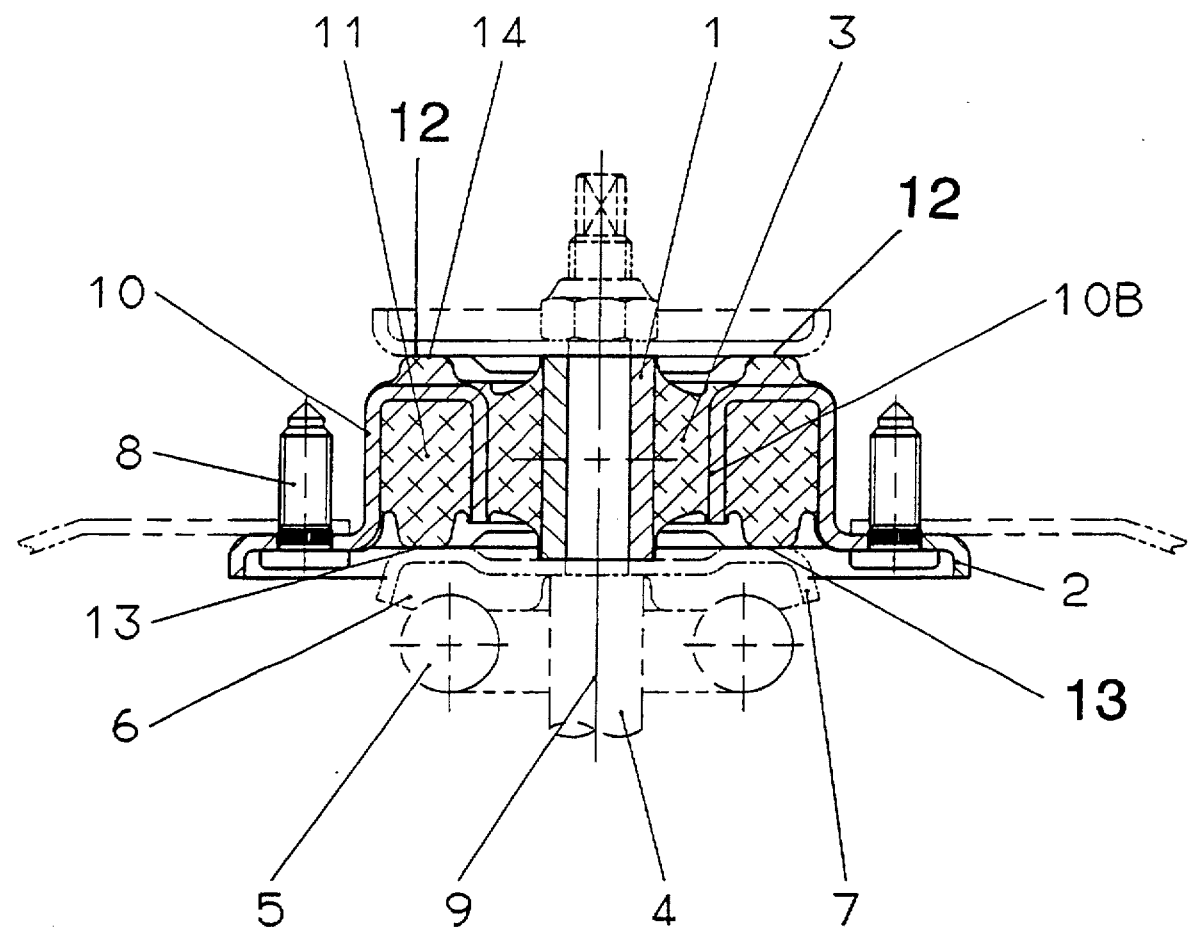
FIG. 1 is a vertical sectional view in an axial plane.
Figure 2:
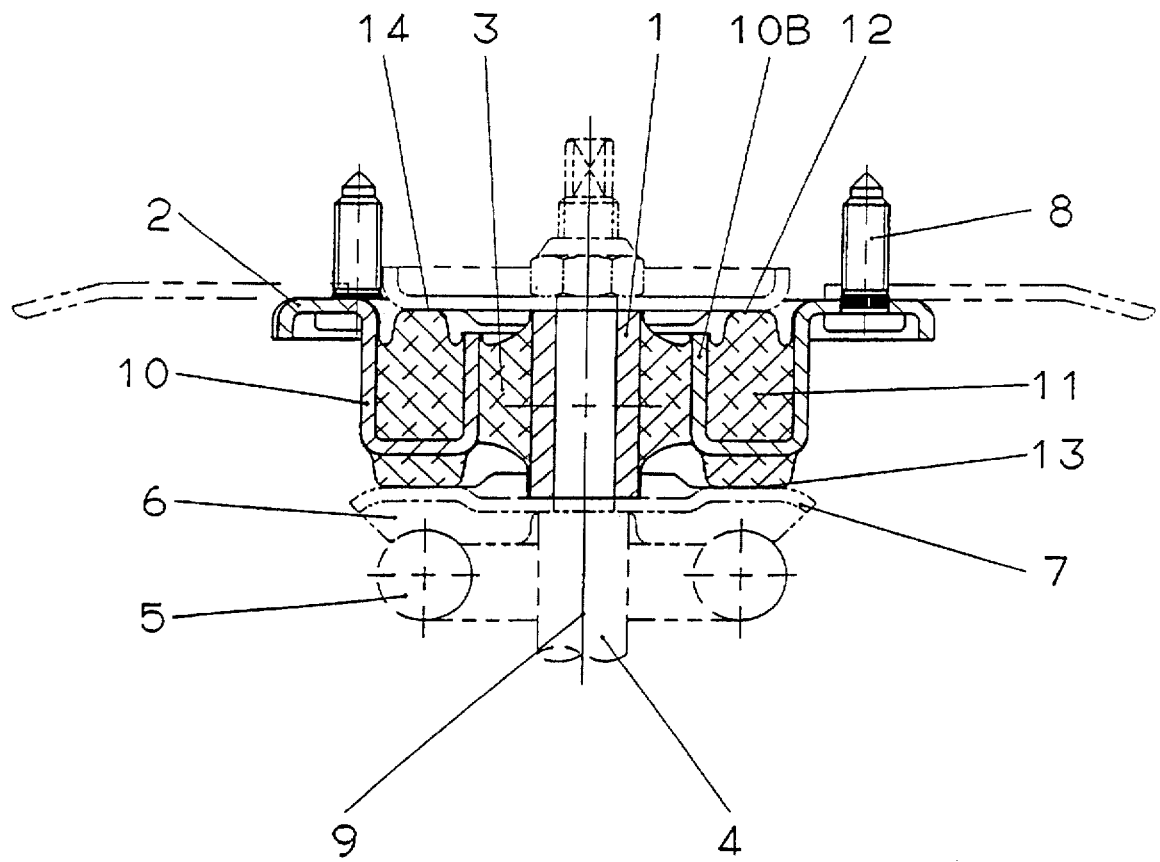
FIG. 2 is a vertical sectional view of a design that is the mirror image of that in FIG. 1.
Figure 4:
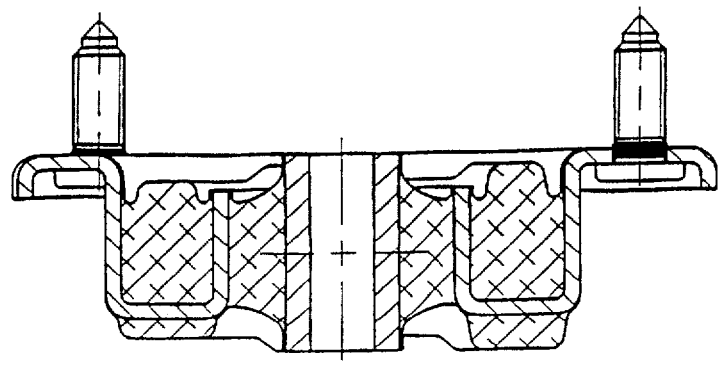
FIG. 4 is a sectional view along line IV—IV in FIG. 3.
Figure 3:
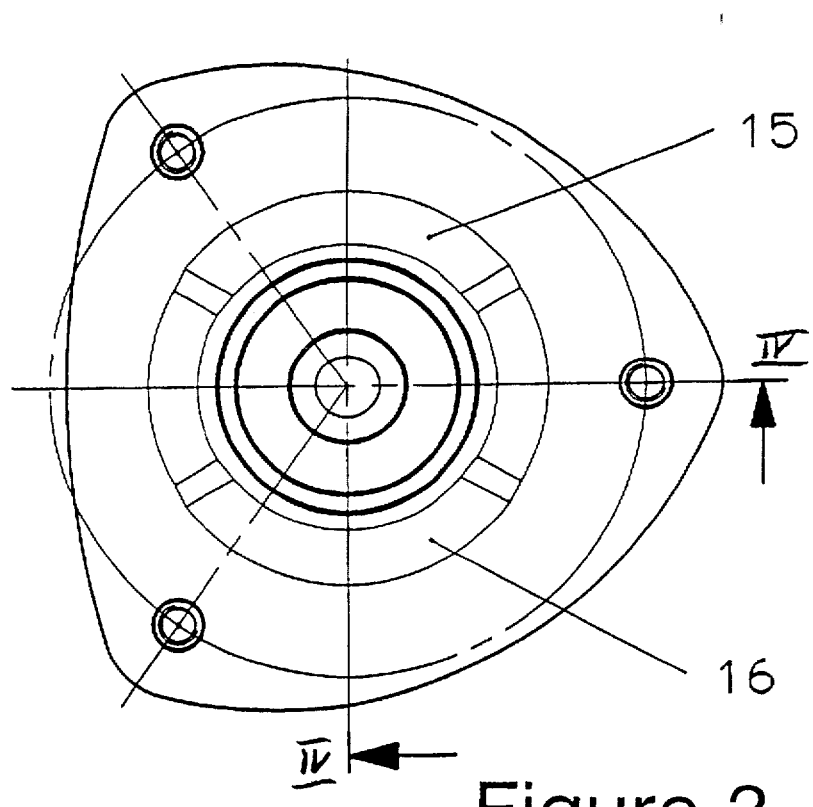
FIG. 3 is a top view of a design according to FIG. 1 or 2.

The upper MacPherson strut bearing according to the exemplary embodiment comprises a middle support body 1, a support flange 2, and an elastomeric material 3, which connects these two to one another and is adherently connected to the two components 1 and 2 by vulcanization. The shock absorber 4, which is not specifically shown in the drawing, is screwed together with the support piece 1. The coil spring 5 of the said shock absorber, acting as a bearing spring, is supported by means of a buffer ring 6 made of rubber or the like against the underside of a supporting disk 7 firmly clamped between the shock absorber 4 and the support piece 1. The support flange 2 can be fastened, on the other hand, to a motor vehicle part, likewise not shown specifically, by means of screws 8.

Joining the radially extending fastening area, the support flange 2 is designed, toward the central axis 9 of the bearing, by material deformation, with an upwardly or downwardly open U-shaped section 10 with an annular (or ring) vertical section, which accommodates an essential amount of the material of the rubber buffer 11, on which an upper stop face 12 and a lower stop face 13 are located. The stop face 12 projecting upward from the open side of the annular U-shaped section (or ring U-shaped portion) 10 is in contact with a flange disk 14 rigidly connected to the support piece 1. The lower stop face 13 cooperates with an annular contact surface on the top side of the supporting disk 7. The width of the stop faces 12 and 13 can be designed freely and thus can be selected to be sufficiently large for adaptation to the loads occurring. The stop faces may also be provided with openings 15 and 16 in order to adapt the compliance in defined directions to the needs.

While specific embodiments of the invention have been shown and described in detail to illustrate the application of the principles of the invention, it will be understood that the invention may be embodied otherwise without departing from such principles.

What is claimed is:

1. An upper MacPherson strut step bearing for wheel suspensions in a motor vehicle, comprising:
    a metallic support body which can be connected to a shock absorber;
    a metallic support flange which can be fastened to the vehicle body;
    a vulcanized elastomeric material connecting said metallic support flange with said metallic support body, said elastomeric material including a rubber buffer with a lower stop face and an upper stop face;
    a support disk in contact with said lower stop face, said support disk having an underside supporting a coiled spring by means of a buffer ring;
    a flange disk rigidly connected to said metallic support body, said flange disk being in contact with said upper stop face, said support flange having an annular section which is U-shaped in a vertical section of a plane through which a longitudinal axis of the MacPherson strut bearing extends, said U-shaped section including a bottom segment which is parallel to said lower stop face and side segments connected to said bottom segment, said side segments and said bottom segment enclosing a portion of the material of said rubber buffer on three sides to define a chamber with one side that is open in an upward or downward direction, a fourth side of said portion of the material of said rubber buffer forming one of said lower stop face and said upper stop face and being located between said side segments.

2. A MacPherson strut step bearing according to claim 1, wherein said annular U-shaped section of said support flange is open in an upward direction defining an open upper side, said rubber buffer projecting from said open upper side and forming said upper stop face, said rubber buffer with said lower stop face being vulcanized to an underside of said annular U-shaped section.

3. A MacPherson strut step bearing according to claim 2, wherein said elastomeric material connecting said support body to said support flange and said rubber buffer are formed of the same material and are vulcanized in one piece.

4. A MacPherson strut step bearing according to claim 1, wherein said elastomeric material connecting said support body to said support flange and said rubber buffer are formed of the same material and are vulcanized in one piece.

5. An upper MacPherson strut step bearing for wheel suspensions in a motor vehicle, comprising:
    a metallic support body which can be connected to a shock absorber;
    a metallic support flange which can be fastened to the vehicle body;
    a vulcanized elastomeric material connecting said metallic support flange with said metallic support body, said elastomeric material including a rubber buffer with a lower stop face and an upper stop face;
    a support disk in contact with said lower stop face, said support disk having an underside supporting a coiled spring by means of a buffer ring;
    a flange disk rigidly connected to said metallic support body, said flange disk being in contact with said upper stop face, said support flange having an annular section which is U-shaped in cross section, said U-shaped section including a base segment which is parallel to said lower stop face and side segments connected to said base segment, said side segments and said base segment enclosing a portion of the material of said rubber buffer on three sides to define a chamber with one side that is open in a direction a fourth side of said portion of the material of said rubber buffer forming one of said lower stop face and said upper stop face and being located between said side segments.

6. A MacPherson strut step bearing according to claim 5, wherein said annular U-shaped section of said support flange is open in an upward direction defining an open side, said rubber buffer projecting from said open side and forming said upper stop face, said rubber buffer with said lower stop face being vulcanized to an underside of said annular U-shaped section.

7. A MacPherson strut step bearing according to claim 6, wherein said elastomeric material connecting said support body to said support flange and said rubber buffer are formed of the same material and are vulcanized in one piece.

8. A MacPherson strut step bearing according to claim 5, wherein said elastomeric material connecting said support body to said support flange and said rubber buffer are formed of the same material and are vulcanized in one piece.

9. An upper MacPherson strut step bearing for wheel suspensions in a motor vehicle, comprising:
    a metallic support body which can be connected to a shock absorber;
    a metallic support flange which can be fastened to the vehicle body;
    a vulcanized elastomeric material connecting said metallic support flange with said metallic support body, said elastomeric material including a rubber buffer with a lower stop face and an upper stop face;
    a support disk in contact with said lower stop face, said support disk having an underside supporting a coiled spring;
    a buffer ring disposed between said support disk underside and the coiled spring;

a flange disk rigidly connected to said metallic support body, said flange disk being in contact with said upper stop face, said support flange having a ring portion which is U-shaped in cross section to provide a ring U-shaped portion including a base segment which is parallel to said lower stop face and side segments connected to said base segment, said side segments and said base segment enclosing a portion of said elastomeric material of said rubber buffer on three sides to define a chamber with one side, opposite said base segment being open in an upward or downward direction, one of said lower stop face and said upper stop face of said rubber buffer being formed of said elastomeric material disposed outside said chamber adjacent to said segment and another of said lower stop face and said upper stop face of said rubber buffer being formed of said portion of said elastomeric material, wherein a fourth side of said portion of said elastomeric material forms one of said lower stop face and said upper stop face at a location between said side segments.

10. A MacPherson strut step bearing according to claim 9, wherein said ring U-shaped section of said support flange is open in an upward direction defining an open side, said rubber buffer projecting from said open side and forming said upper stop face, said rubber buffer with said lower stop face being vulcanized to an underside of said ring U-shaped section.

11. A MacPherson strut step bearing according to claim 10, wherein said elastomeric material connecting said support body to said support flange and said rubber buffer are formed of the same material and are vulcanized in one piece.

12. A MacPherson strut step bearing according to claim 9, wherein said elastomeric material connecting said support body to said support flange and said rubber buffer are formed of the same material and are vulcanized in one piece.

* * * * *